United States Patent
Wengerter et al.

(10) Patent No.: US 8,077,789 B2
(45) Date of Patent: Dec. 13, 2011

(54) REPETITION-DEPENDENT MAPPING FOR HIGHER ORDER MODULATION SCHEMES

(75) Inventors: Christian Wengerter, Kleinheubach (DE); Alexander Golitschek Edler Von Elbwart, Darmstadt (DE); Isamu Yoshii, Frankfurt (DE)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 11/911,155

(22) PCT Filed: Apr. 28, 2005

(86) PCT No.: PCT/EP2005/004596
§ 371 (c)(1),
(2), (4) Date: May 9, 2008

(87) PCT Pub. No.: WO2006/114126
PCT Pub. Date: Nov. 2, 2006

(65) Prior Publication Data
US 2008/0279303 A1  Nov. 13, 2008

(51) Int. Cl.
*H04L 5/12* (2006.01)
(52) U.S. Cl. ........................................ 375/265
(58) Field of Classification Search .......... 375/260–261, 375/265, 285, 295; 714/752, 786, 790, 792
See application file for complete search history.

(56) References Cited

U.S. PATENT DOCUMENTS

| | | | | |
|---|---|---|---|---|
| 6,738,370 B2 * | 5/2004 | Ostman | ........................ | 370/349 |
| 6,973,611 B2 * | 12/2005 | Dabak et al. | .................. | 714/755 |
| 7,093,178 B2 * | 8/2006 | Kim et al. | ...................... | 714/748 |
| 7,280,606 B2 * | 10/2007 | Kim et al. | ...................... | 375/295 |
| 7,453,948 B2 * | 11/2008 | Kim et al. | ...................... | 375/267 |
| 7,676,732 B2 * | 3/2010 | Moon et al. | ................... | 714/774 |
| 2003/0031233 A1 | 2/2003 | Kim et al. | | |
| 2003/0081576 A1 * | 5/2003 | Kim et al. | ...................... | 370/335 |
| 2003/0097629 A1 * | 5/2003 | Moon et al. | ................... | 714/751 |
| 2003/0120995 A1 | 6/2003 | Kim et al. | | |
| 2005/0204251 A1 * | 9/2005 | Moon et al. | ................... | 714/748 |

FOREIGN PATENT DOCUMENTS

| | | |
|---|---|---|
| EP | 1313248 | 5/2003 |
| WO | 2004036817 | 4/2004 |

OTHER PUBLICATIONS

PCT International Search Report dated Dec. 29, 2005.
International Preliminary Report on Patentability Chapter 1 (IPRP1) dated Oct. 30, 2007.
Written Opinion of the International Search Authority (WOSA) dated Oct. 28, 2007.

(Continued)

*Primary Examiner* — Khanh C Tran
(74) *Attorney, Agent, or Firm* — Dickinson Wright PLLC

(57) ABSTRACT

A method and apparatus is disclosed, for digital data transmission using higher order modulation schemes, wherein a plurality of bits is mapped to bit positions of a symbol and the transmission has different error probabilities for at least two out of the bit positions. Bits are selected from a data stream of original bits for repetition and repeated. Repeated and unrepeated bits are mapped to modulation symbols, wherein the mapping of bits to bit positions depends on the error probabilities of the bit positions and on the selection result.

23 Claims, 10 Drawing Sheets

OTHER PUBLICATIONS

M. Dottling, et al.; "Incremental Redundancy and Bit-Mapping Techniques for High Speed Downlink Packet Access," GLOBECOM 2003, IEEE 2003, pp. 908-912.

C. Wengerter, et al.; "Advanced Hybrid ARQ Technique Employing Signal Constellation Rearrangement," XP-002355843, IEEE 2002, pp. 2002-2006.

3GPP TS 25.308 V5.3.0 (Dec. 2002) Technical Specification "3rd Generation Partnership Project; Technical Specification Group Radio Access Network; High Speed Downlink Packet Access (HSDPA); Overall description; Stage 2 (Release 5)," Dec. 2002, pp. 1-29.

3GPP TS 25.212 V5.3.0 (Dec. 2002) Technical Specification, "3rd Generation Partnership Project Technical Specification Group Radio Access Network; Multiplexing and channel coding (FDD) (Release 5)," Dec. 2002, pp. 1-74.

* cited by examiner

| mapped onto $i_1$ and $q_1$ (16-QAM high reliable positions) | | mapped onto $i_2$ and $q_2$ (16-QAM low reliable positions) | |
|---|---|---|---|
| $P^2_{10}$ | $P^2_{11}$ | $P^2_{12}$ | $P^2_{12}$ |
| $P^2_7$ | $P^2_8$ | $P^2_9$ | $P^2_9$ |
| $P^2_4$ | $P^2_5$ | $P^2_6$ | $P^2_6$ |
| $P^2_1$ | $P^2_2$ | $P^2_3$ | $P^2_3$ |
| $P^1_{10}$ | $P^1_{12}$ | $P^1_{11}$ | $P^1_{11}$ |
| $P^1_7$ | $P^1_9$ | $P^1_8$ | $P^1_8$ |
| $P^1_4$ | $P^1_6$ | $P^1_5$ | $P^1_5$ |
| $P^1_1$ | $P^1_3$ | $P^1_2$ | $P^1_2$ |
| $S_{11}$ | $S_{12}$ | $S_{10}$ | $S_{10}$ |
| $S_8$ | $S_9$ | $S_7$ | $S_7$ |
| $S_5$ | $S_6$ | $S_4$ | $S_4$ |
| $S_2$ | $S_3$ | $S_1$ | $S_1$ |

Fig.7

| mapped onto $i_1$ and $q_1$ (16-QAM high reliable positions) | | mapped onto $i_2$ and $q_2$ (16-QAM low reliable positions) | |
|---|---|---|---|
| $P^2_{10}$ | $S_8$ | $P^1_{11}$ | $P^2_{12}$ |
| $S_9$ | $P^2_8$ | $P^2_9$ | $S_{10}$ |
| $P^2_4$ | $P^2_5$ | $P^2_{12}$ | $P^2_6$ |
| $P^2_1$ | $S_6$ | $P^2_3$ | $P^1_8$ |
| $P^2_{11}$ | $P^1_{12}$ | $P^1_{11}$ | $P^2_6$ |
| $P^1_7$ | $P^1_9$ | $P^2_3$ | $P^1_8$ |
| $P^1_4$ | $P^1_{10}$ | $P^1_2$ | $P^1_5$ |
| $S_2$ | $P^1_3$ | $P^1_2$ | $S_4$ |
| $P^2_7$ | $S_{12}$ | $S_1$ | $S_{10}$ |
| $P^2_2$ | $P^1_1$ | $S_4$ | $S_7$ |
| $S_5$ | $S_{11}$ | $P^1_5$ | $P^2_9$ |
| $P^1_6$ | $S_3$ | $S_1$ | $S_7$ |

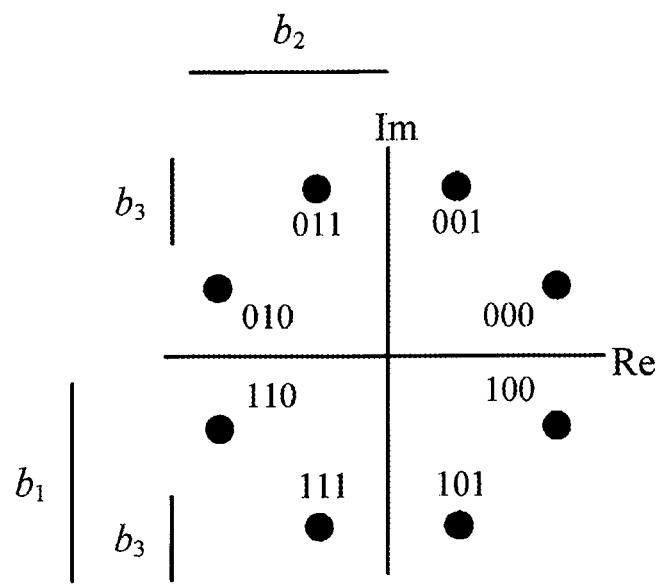
Fig.17  (bit-mapping order: $b_1 b_2 b_3$)
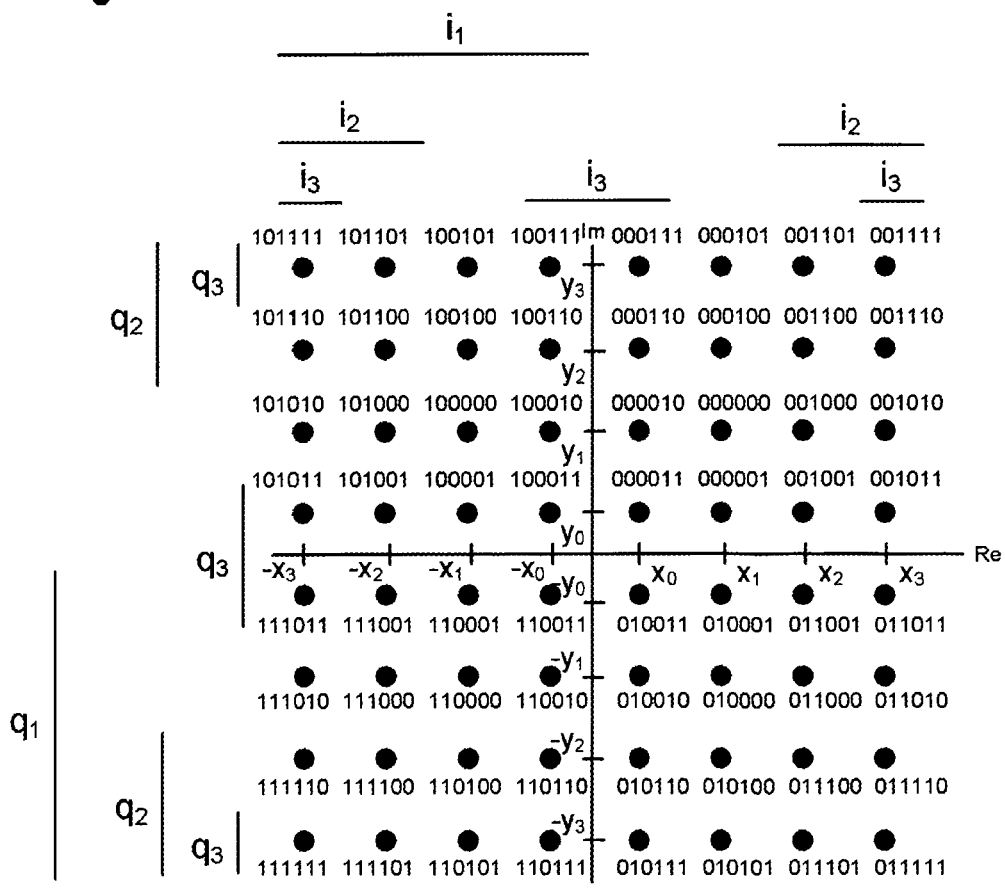
Fig.18  bit-mapping order: $i_1 q_1 i_2 q_2 i_3 q_3$

US 8,077,789 B2

REPETITION-DEPENDENT MAPPING FOR HIGHER ORDER MODULATION SCHEMES

BACKGROUND OF THE INVENTION

1. Field of the Invention

The invention relates to communication of data between a transmitter and a receiver. It is particularly applicable to communication systems where the data is transmitted over a time-variant or frequency-variant channel, such as in mobile communication systems or satellite communication.

2. Description of the Related Art

This invention addresses the bit to symbol mapping for higher order modulation schemes and rate matching, e.g. in a system employing link adaptation by Adaptive Modulation and Coding (AMC) as described for example in 3GPP TS 25.308; "High Speed Downlink Packet Access (HSDPA); Overall description; Stage 2", v. 5.3.0, December 2002 and in A. Burr, "Modulation and Coding for Wireless Communications", Pearson Education, Prentice Hall, ISBN 0 201 39857 5, 2001. AMC is used e.g. in 3GPP HSDPA, see for example in 3GPP TS 25.308, cited above, and 3GPP TS 25.212; "Multiplexing and Channel Coding (FDD)", v. 5.3.0, December 2002.

In higher order modulation schemes, a plurality of bits $b_1, \ldots, b_i, \ldots, b_n$ (generally n>2) is mapped onto one symbol. This plurality of bits can be expressed as a binary word (or vector of bits) $b_1 \ldots b_i \ldots b_n$, wherein to each value of this word or vector a certain modulation state is assigned. This assignment is called the "mapping" of bits to symbols. The order number i specifies the position of a certain bit (digit) within this word or vector and is hence called the "bit position".

Due to noise and different kinds of distortion in the transmission chain (channel), there is a certain probability for defined values of the bits $b_1$ to $b_{i-1}$ and $b_{i+1}$ to $b_n$, that the transmission chain (channel) will erroneously alter a value "0" of bit $b_i$, input into the mapper and modulator, into a value "1", output from the demodulator. Accordingly there is a probability for turning a "1" into a "0", which may be equal to the first probability. Averaging these probabilities for "0" and "1" and for all combinations of values of the other bits yields an error probability for bit $b_i$ regarding to the transmission chain.

Further herein below, the term "high reliability" related to a bit position will be regarded as equivalent to "low error probability" and the term "low reliability" related to a bit position will be regarded as equivalent to "high error probability". In most cases reliability may me regarded upon as inversely proportional to the error probability. For a detailed discussion of reliability and error probability of bit positions in modulation schemes see Ch. Wengerter, A. Golitschek Edler von Elbwart, E. Seidel, G. Velev, M. P. Schmitt, "Advanced hybrid ARQ technique employing a signal constellation rearrangement," IEEE VTC 2002 Fall, vol. 4, pp. 2002-2006, 2002.

Depending on the modulation scheme and on the applied mapping of words to symbols, different bit positions may possess similar or equal error probabilities or significantly different error probabilities.

FIG. 1 shows a simplified typical Physical Layer (PHY) transmitter processing chain, when AMC is applied. K information bits including CRC bits are fed into a channel encoder 101 (e.g. Turbo coding, convolutional coding, LDPC coding, etc.), which encodes the information bit sequence typically block wise into a N bit sequence (typically N>K). The encoder type and rate may be fixed or may be controlled by the AMC control unit 102. The encoder generates a sequence of "original" bits encoded at rate $r_{EC}$=K/N. The output of the encoder is fed into a rate matching block 103, which outputs L "transmission" bits. This adjusts the encoder rate $r_{EC}$ according to the AMC control 102 (e.g. based on channel estimation) to $r_{RM}$=K/L. The rate matching typically implements puncturing and repetition, i.e. if L<N, bits are punctured and if L>N, bits are repeated. However, puncturing and repetition may also be applied simultaneously, i.e. some bits may be punctured and some bits may be repeated. In this case, for L<N the puncturing rate is greater than the repetition rate and for L>N the puncturing rate is smaller than the repetition rate.

It should be noted that in the context of the description below, repetition for the purpose of rate matching is regarded, as opposed to ARQ (Automatic Repeat reQuest), where the repetition is based on information on the quality of the received data, fed back by the receiver via a transmission channel in the opposite direction. That is, the repetition regarded herein is taking place within the same transmission attempt as the original transmission, in most cases even within the same data block.

Furthermore it can be assumed that bits are not punctured and repeated at the same time, that is, punctured bits are not transmitted at all and therefore also not repeated.

The output of the rate matching 103 is then usually interleaved, where the used interleaver type or the interleaver parameters may also be controlled by the AMC control unit. The output of the interleaver 104 is then fed into the modulator (mapper) 105, which maps the bits onto modulation symbols. The modulation scheme is controlled by the AMC control, i.e. the selected M-ary modulation scheme (e.g. QPSK, 8 PSK, 16 QAM, 64-QAM) generates L/M modulation symbols according to the defined mapping and signal constellation.

In the following, the prior art is described with respect to current 3GPP HSDPA PHY processing chain implementation as shown in FIG. 2 (from 3GPP TS 25.212, cited above). For the sake of simplicity only relevant blocks are shown. The stream of original bits output from HSDPA rate 1/3 Turbo encoder 201 is fed into the rate matching block 203 by three bit streams (systematic bits, parity 1 bits and parity 2 bits). The rate-matching adapts the code rate according to an AMC control unit, which defines the number of output transmission bits to be generated by the rate matching. The rate-matching block 203 performs puncturing and/or repetition of its input bits according to the rate matching algorithm specified in 3GPP TS 25.212. Note that the rate matching in HSDPA is performed in two steps in order to allow practical hybrid ARQ (Automatic Repeat reQuest) operation, see FIG. 17 in 3GPP TS 25.212. In the bit collection block 206, the three output streams of the rate matching block are written into a matrix with either $N_{row}$=4 rows (for 16 QAM) or $N_{row}$=2 rows (for QPSK) and an according number of columns. The following description will focus on the operation with 16 QAM. The matrix is written such that the first rows are filled preferably with systematic bits and the remaining space is filled alternating with parity 1 and parity 2 bits (details can be found in section 4.5.4.4 in 3GPP TS 25.212) as shown for different rates $r_{RM}$ in FIG. 3 and FIG. 4. Note that the shown puncturing patterns, repetition patterns and block sizes may not exactly match the HSDPA specification, but are used in order to illustrate the general concept. Then the transmission bits from rows 1&2 and rows 3&4 are separately interleaved in interleavers 204a and 204b and fed into the modulator 205. The transmission bits from Interleaver 1 (204a) are mapped onto the bit positions $i_1$ and $q_1$ and the transmission bits from Interleaver 2 (204b) are mapped onto the bit positions $i_2$ and $q_2$ of the 16 QAM signal constellation. (see FIG. 5 for a mapping example with $i_1$ and $q_1$ mapped on high reliable positions and $i_2$ and $q_2$ mapped on low reliable positions).

The explained HSDPA implementation assures that preferably the systematic bits are mapped onto the bits $i_1$ and $q_1$. Assuming that a 16 QAM mapping as shown in FIG. 5 is used, this assures that transmission bits of the systematic original bits are mapped onto the 16 QAM high reliable positions.

US 2003/0120995 A1 is related to the SMP (Symbol Mapping method based on Priority) technique, which has been adopted for 3GPP HSDPA (as described above). SMP splits the bit sequence into two bit streams with different priorities. The high priority bit stream is mapped onto the M-QAM (or M-PSK) high reliable positions and the low priority bit stream is mapped onto the low reliable positions. The priority of a bit is dependent on the contents of a bit, i.e. whether it is a systematic bit (high priority) or a parity bit (low priority). Bits are written row wise into a matrix (buffer) and read column-wise.

Prior art does not consider the variations in bit reliabilities when mapping repeated bits onto higher order modulation schemes, i.e. when a bit is repeatedly transmitted (that is, several transmission bits of the same original bit are transmitted), its reliability increases with respect to non-repeatedly transmitted bits. E.g. according to the HSDPA implementation as shown in FIG. 2, for the 16 QAM ($r_{RM}$=0.25) example the repeated bits are mapped (randomly) on any 16 QAM bit position (see repeated bits with hatched background in FIG. 4). Here, whether a bit is (preferably) mapped onto a high reliable position ($i_1$ and $q_1$) or on a low reliable position ($i_2$ and $q_2$) depends on its content, i.e. depends on whether a bit is a systematic bit or a parity bit.

The prior art schemes cause disadvantages in decoding, since after soft combining of the repeated bits, the bit reliabilities (of all bits) show significant variation.

SUMMARY OF THE INVENTION

It is an object of the present invention to provide a method for controlling the reliability of transmitted bits.

It is another object of the present invention to provide a more evenly distributed bit reliability irrespective of the contents of the transmitted bits.

It is another object of the present invention to improve the decoding performance for commonly used coding schemes.

These objects are achieved by a method according to claim 1, a computer-readable storage medium according to claim 14, a transmitter according to claim 15, a base station according to claim 18, a mobile station according to claim 19 and a mobile communication system according to claim 20.

According to the present invention, the bit positions to which a bit is mapped depends on the decision about repetitions of the mapped bits as well as on the reliability of the bit positions. This allows a control of the bit reliabilities after (soft) combining at the receiver, which may result in a more even distribution of the reliability of combined bits and therefore in an improved decoding performance.

According to one aspect of the present invention, a method for digital data transmission using higher order modulation schemes, wherein a plurality of transmission bits is mapped to bit positions of a symbol and the transmission has different error probabilities for at least two out of said bit positions, comprises the steps of a) selecting bits from a data stream of original bits for repetition and repeating the selected bits to obtain a stream of transmission bits; b) mapping transmission bits to modulation symbols, wherein bits are mapped preferentially to bit positions selected depending on the error probabilities of the bit positions and depending on the selection result of step a); and c) modulating a carrier according to the mapped bits.

In another aspect of the present invention, a computer-readable data storage medium has stored thereon instructions which, when executed in a processor of a digital data transmitter, cause the transmitter to perform a method for digital data transmission using higher order modulation schemes, wherein a plurality of transmission bits is mapped to bit positions of a symbol and the transmission has different error probabilities for at least two out of said bit positions, the method comprising the steps of a) selecting bits from a data stream of original bits for repetition and repeating the selected bits to obtain a stream of transmission bits; b) mapping transmission bits to modulation symbols, wherein bits are mapped preferentially to bit positions selected depending on the error probabilities of the bit positions and depending on the selection result of step a); and c) modulating a carrier according to the mapped bits.

According to a further aspect of the present invention, a transmitter for digital data transmission using higher order modulation schemes, wherein a plurality of transmission bits is mapped to bit positions of a symbol and the transmission has different error probabilities for at least two out of said bit positions, comprises rate matching means for selecting bits from a data stream of original bits for repetition, and for repeating the selected bits to obtain a stream of transmission bits; mapping means for mapping transmission bits to modulation symbols, wherein bits are mapped preferentially to bit positions selected depending on the error probabilities of the bit positions and depending on the selection result of said rate matching means; and means for modulating a carrier according to the mapped bits.

According to still another aspect of the present invention, a base station for a mobile communication system comprises at least one transmitter for digital data transmission using higher order modulation schemes, wherein a plurality of transmission bits is mapped to bit positions of a symbol and the transmission has different error probabilities for at least two out of said bit positions, and the transmitter comprises rate matching means for selecting bits from a data stream of original bits for repetition, and for repeating the selected bits to obtain a stream of transmission bits; mapping means for mapping transmission bits to modulation symbols, wherein bits are mapped preferentially to bit positions selected depending on the error probabilities of the bit positions and depending on the selection result of said rate matching means; and means for modulating a carrier according to the mapped bits.

According to still a further aspect of the present invention, a mobile station for a mobile communication system comprises at least one transmitter for digital data transmission using higher order modulation schemes, wherein a plurality of transmission bits is mapped to bit positions of a symbol and the transmission has different error probabilities for at least two out of said bit positions, and the transmitter comprises rate matching means for selecting bits from a data stream of original bits for repetition, and for repeating the selected bits to obtain a stream of transmission bits; mapping means for mapping transmission bits to modulation symbols, wherein bits are mapped preferentially to bit positions selected depending on the error probabilities of the bit positions and depending on the selection result of said rate matching means; and means for modulating a carrier according to the mapped bits.

According to still another aspect of the present invention, a mobile communication system comprising at least one base station and/or at least one mobile station according to the preceding two aspects.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein

FIG. 3 illustrates an example for HSDPA bit collection for 16-QAM with puncturing ($r_{RM}=0.5625$) according to prior art;

FIG. 4 shows an example for HSDPA bit collection for 16-QAM with repetition ($r_{RM}=0.25$) according to prior art;

FIG. 6 depicts an example for matrix based bit collection for 16-QAM with repetition ($r_{RM}=0.25$);

FIG. 7 shows an example for matrix based bit collection for 16-QAM with repetition ($r_{RM}=0.25$) including interleaving;

FIG. 17 shows a 8-PSK signal constellation with Gray mapping with $b_1$ and $b_2$ mapped on positions with high reliability and $b_3$ mapped on the position with low reliability; and FIG. 18 depicts a 64-QAM signal constellation with Gray mapping with $i_1$ and $q_1$ mapped on positions with high reliability, $i_2$ and $q_2$ mapped on positions with medium reliability and $i_3$ and $q_3$ mapped on positions with low reliability.

DETAILED DESCRIPTION OF THE INVENTION

Figure 1:
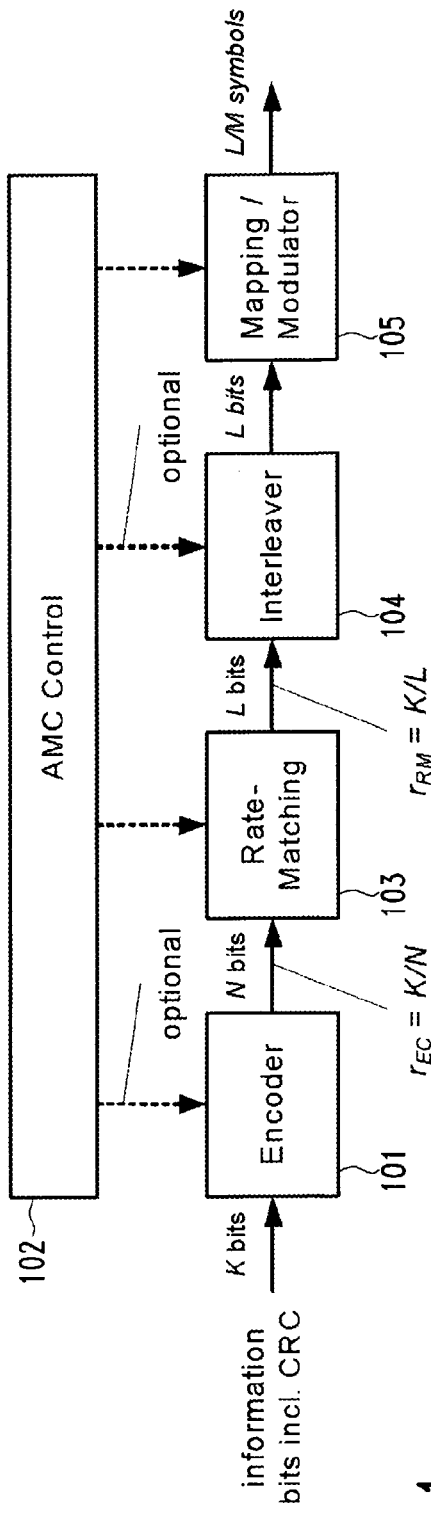
FIG. 1 shows a simplified general physical layer transmitter processing chain according to prior art.
Figure 2:
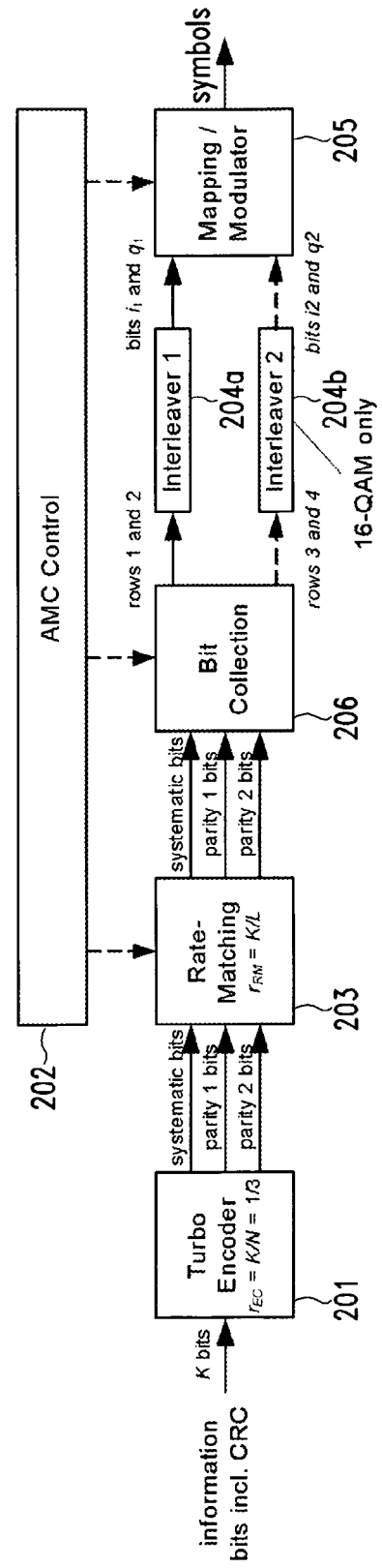
FIG. 2 depicts a simplified HSDPA transmitter physical layer processing chain according to prior art.

The illustrative embodiments of the present invention will be described with reference to the figure drawings, wherein like elements and structures are indicated by like reference numbers.

Figures 3, 4:
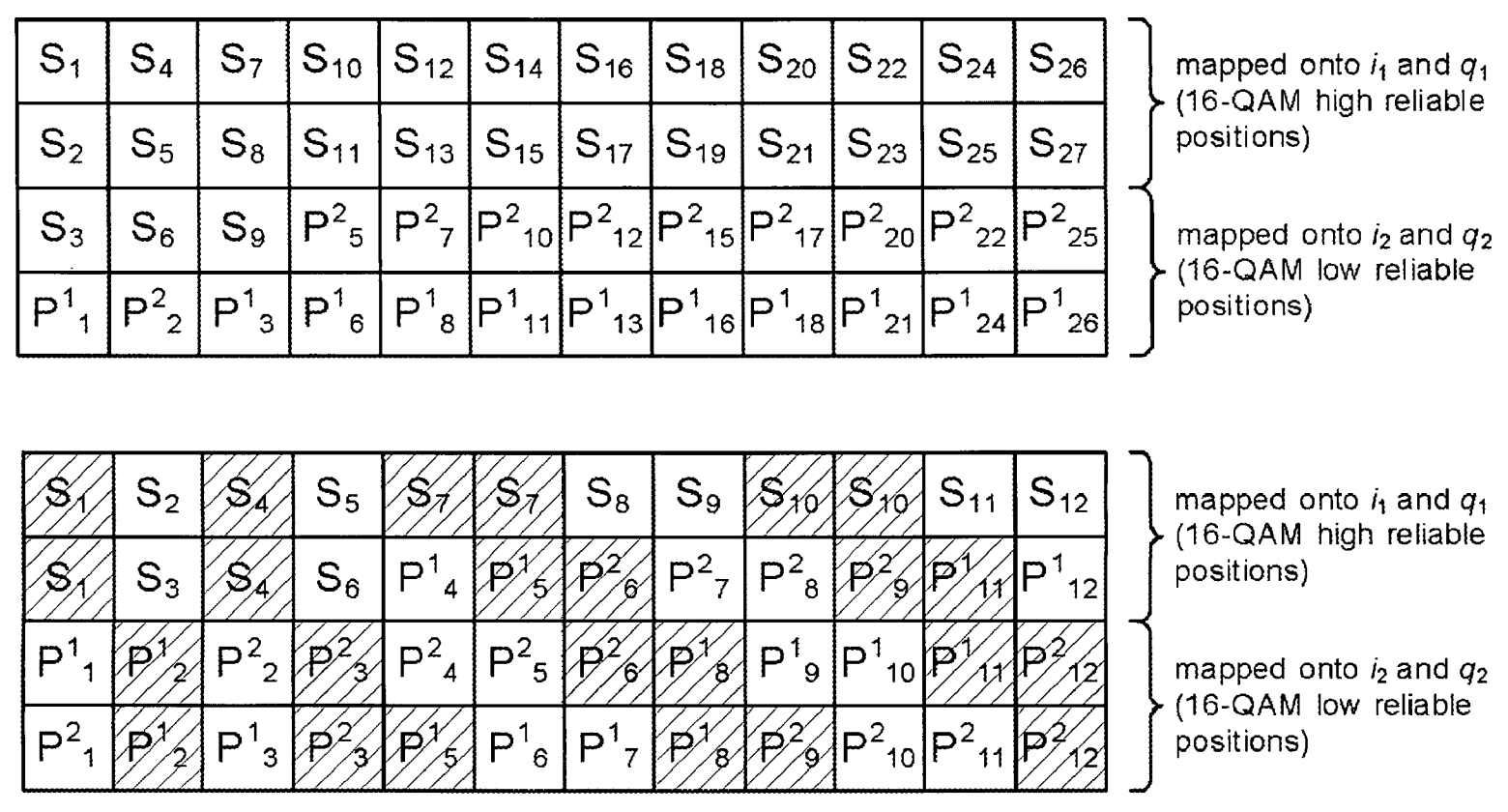

The invention will be explained in detail using the earlier introduced HSDPA example for 16 QAM with $r_{RM}=0.25$, assuming a mapping according to FIG. 5 with $i_1$ and $q_1$ denoting the positions with high reliability (low error probability) and $i_2$ and $q_2$ denoting the positions with low reliability (high error probability). The disclosed concept requires that the transmission bits of repeated original bits (hatched in FIG. 4), have to be mapped preferably on the 16-QAM positions with low reliability (two out of four bits) as e.g. shown in FIG. 6 (or FIG. 7 including interleaving). Since on average the transmission bits mapped on the positions with high reliability have about twice the magnitude in LLR (Log Likelihood Ratio) compared to the ones on the positions with low reliability (see e.g. Wengerter et al., cited above), this equalizes the bit reliabilities of the original bits. I.e., if original and repetition of the repeated bits, mapped onto the positions having low reliability, are soft combined (e.g. LLR addition) at the receiver, the reliabilities of those original bits are equalized to those of the non repeated original bits which are mapped onto the positions with high reliability. This results into a more homogenous distribution of bit reliabilities, which in turn yields an improved decoding performance for most coding schemes (e.g. Turbo coding).

In order to achieve a mapping with the properties as disclosed above and shown in FIG. 6 and FIG. 7, several implementation options are possible. In the following some implementation examples are given.

EXAMPLE 1

FIG. 8

Original bits output from encoder 801 are fed to the rate matching block 803. The rate matching block 803 outputs the transmission bits of non repeated and repeated original bits separately, where $L_S$ denotes the number of transmission bits belonging to non repeated original bits which are transmitted only once and $L_R$ denotes the number of transmission bits belonging to repeated original bits, original plus (at least one) repetition. The two transmission bit streams are fed into the bit collection block 806, which may be implemented according to one of the following alternatives:

The bits are written into a matrix, where the matrix contains as many rows as bits are mapped onto one modulation symbol, with each row representing one bit position of the modulation symbols, i.e. M rows for a modulation scheme with $2^M$ states (e.g. 4 rows for 16 QAM, 6 rows for 64 AM, 3 rows for 8 PSK). The repeated bits (original and repetition) are written preferentially onto the rows representing the bit positions with the least reliability (rows 3 and 4, see FIG. 6 or FIG. 7 for 16-QAM). In this alternative, the meaning of row and column may also be exchanged.

The bits are written into a vector containing groups of bits. Each group contains of as many bits as bits are mapped onto one modulation symbol, and each bit in a group represents one bit position of a modulation symbol (e.g. 4 bits per group for 16 QAM, 6 bits per group for 64 AM, 3 bits per group for 8 PSK). The repeated bits are written preferentially onto the bits in a group representing the bit positions with the least reliability.

The output of the bit collection block may be fed into an interleaver 804 (optional). In this case, the interleaver should be implemented such that the bit positions relative to the intended mapping is not disarranged. E.g. in case of a matrix-based bit collection (similar applies to the vector based bit collection) the interleaver 804 may work according to the following alternatives:

- Only bits from the same row are interleaved with each other, or
- only bits from rows representing bit positions with the same (or similar) reliability are interleaved with each other (see e.g. interleaving from FIG. 6 to FIG. 7 for 16-AM), or
- interleaving is performed column wise (same as modulation symbol interleaving).

The output of the interleaver 804 (or bit collection block) is fed into the modulator 805 with the rows (bit in a group) being mapped onto the appropriate bit position, i.e. the bits of a column/group form one modulation symbol.

AMC control 802 controls at least blocks 803 to 806 such that all bits output from encoder 801 are processed somehow by rate matching unit 803, and that all symbols output from mapper/modulator 805 are appropriately modulated. Optionally AMC control 802 may also adjust the coding rate and/or the coding scheme dynamically.

EXAMPLE 2

FIG. 9 and FIG. 10

Figure 9:
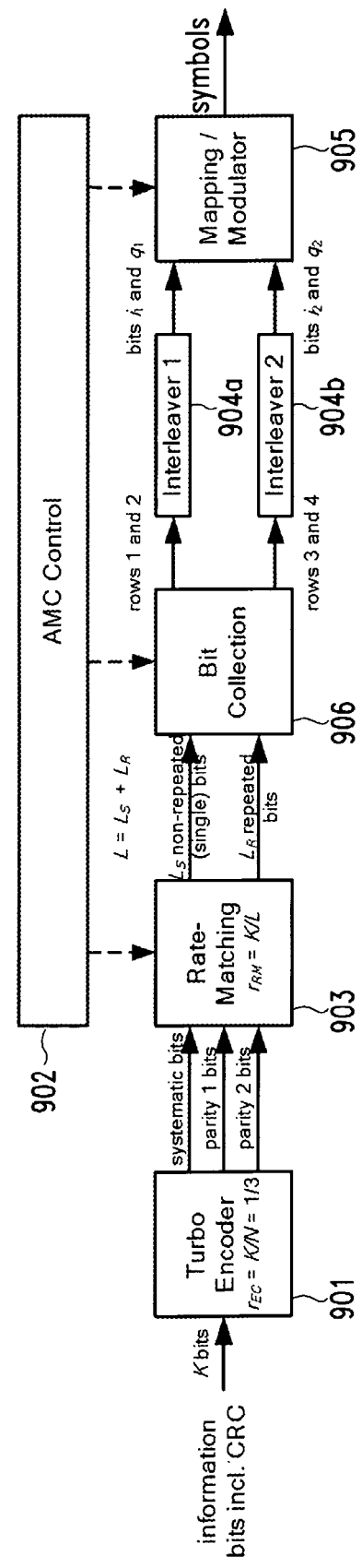
FIG. 9 depicts a simplified HSDPA-like physical layer transmitter chain according to a second example (16 QAM)
Figure 10:
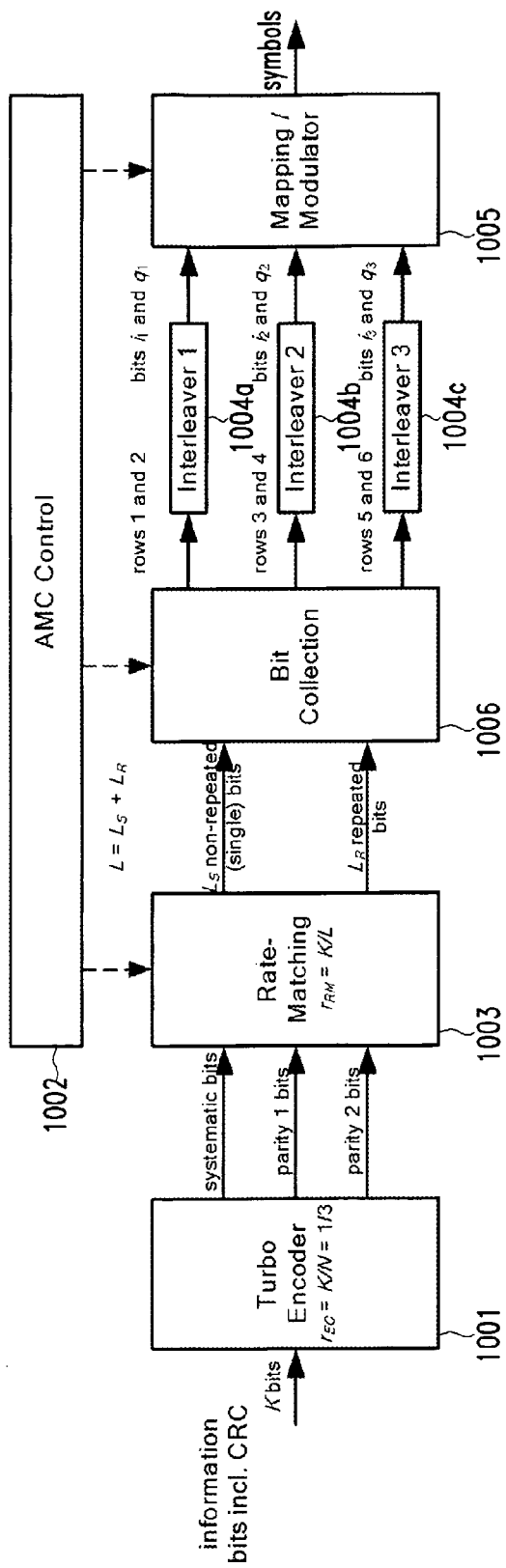
FIG. 10 shows another simplified HSDPA-like physical layer transmitter chain according to the second example (64 QAM)

The bit collection block 906/1006 feeds the rows representing bit positions with the same (or similar) reliability into separate interleavers 904 *a,b* and 1004 *a-c*, respectively. FIG. 9 shows an example for 16 QAM and FIG. 10 shows an example for 64 QAM. Encoder 901, 1101, rate matching unit 903, 1003, mapper/modulator 905/1005 and AMC control 902, 1002 work according to the principles described above.

EXAMPLE 3

Figure 11:
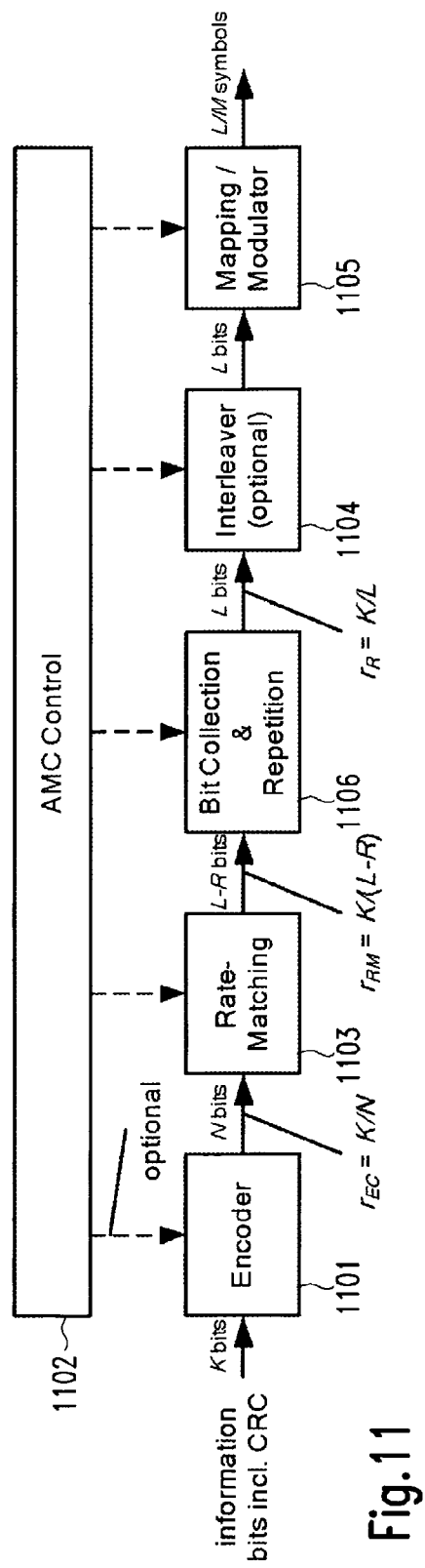
FIG. 11 illustrates a simplified physical layer transmitter chain according to a third example.
Figure 12:
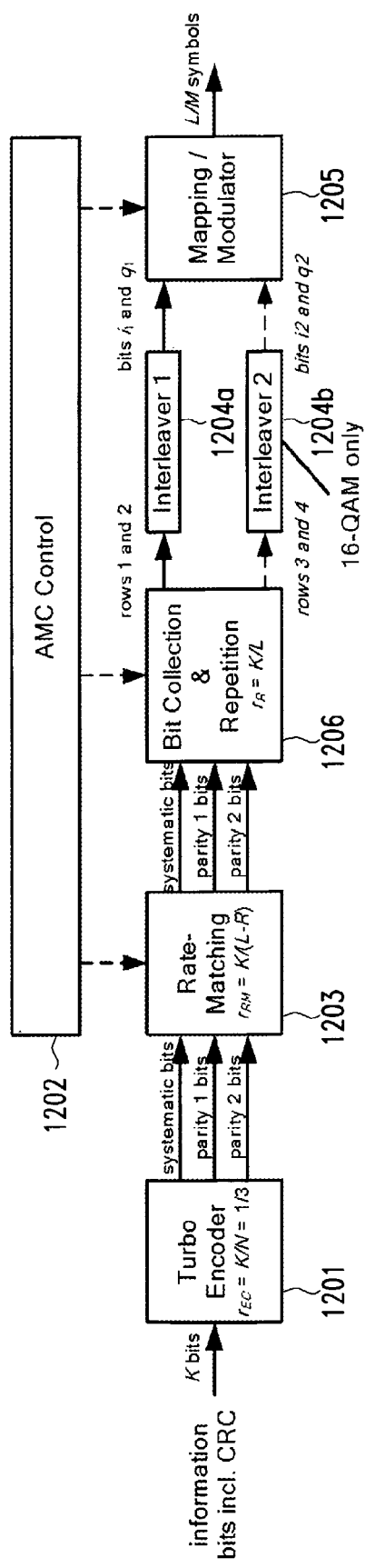
FIG. 12 depicts another simplified HSDPA like physical transmitter chain according to the third example.

FIG. 11 and FIG. 12

The rate matching block 1103, 1203 feeds L-R original bits into the bit collection & repetition block 1106, 1206, which repeats R out of the L-R original bits making a total of L output transmission bits. The repetition of the R bits may be implemented by copying bits from matrix/vector elements to empty matrix/vector elements (assuming that the matrix/vector holds L elements). Considering the example for 16 QAM as shown in FIG. 6, only rows 1-3 of the matrix will be written with bits from the rate matching block and the bit collection & repetition block would copy the elements of row 3 to row 4. Note that the optional interleaver 1104 and the separate interleavers 1204 *a, b* should be defined according to Examples 1 and 2.

FIG. 6 shows an example, where the share of transmission bits (original plus repetition) belonging to repeated original bits is equal to the number of available positions with low reliability, i.e. 50%. The transmission bits of repeated original bits are preferentially mapped onto the positions with low reliability, i.e. the transmission bits of non-repeated bits should preferentially be mapped onto the bit positions with high reliability. To be able to fill all bits of all symbols, and to be able to transmit all bits, the following method may be applied:

- If the amount of transmission bits of repeated original bits is less than the available positions with low reliability (i.e. high error probability), the remaining positions with low reliability are either padded or filled with transmission bits of non repeated original bits.
- If the amount of transmission bits of repeated original bits is larger than the available positions with low reliability, the remaining transmission bits of repeated original bits should be mapped onto the positions with high reliability.

The disclosed concept is applicable to any higher order modulation scheme (more than two transmission bits are mapped onto one modulation symbol), since all higher order modulation schemes have the inherent property of different reliability of different bit positions, for example:

- 8 PSK: Two bit positions with high reliability, one bit position with low reliability.
- 64 QAM: Two bit positions with high reliability, two bit positions with medium reliability and two bit positions with low reliability.

In the case that more than two different bit reliabilities exist, transmission bits of the repeated original bits should preferentially be mapped onto the least reliable bit positions first, then to the second but least reliable positions and so on.

Figure 13:
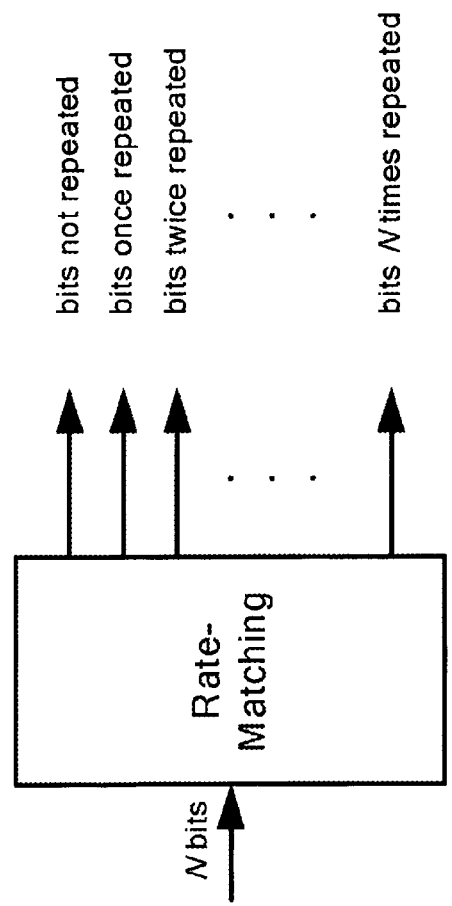
FIG. 13 shows a rate matching block for various repetition factors.

Throughout the explanation above, repetition has been defined such that a bit is repeated once. Generally, a bit may be repeated several times, where the mapping rule should be defined as follows: With increasing number of repetition a transmission bit should be mapped with increasing preference onto the positions with low reliability. I.e. the transmission bits, which belong to original bits repeated most often, should be mapped onto the least reliable positions and so on. Therefore, according to the implementation of Example 1 and Example 2, the rate matching block may have several outputs for different levels of repetition and consequently different levels of required reliability, as defined in FIG. 13. Note that the number of repetitions is zero for an un-repeated original bit.

For example, if there are unrepeated original bits, original bits repeated once and original bits repeated twice and the modulation scheme provides bit positions with three different levels of reliability, transmission bits of original bits which are not repeated (i.e. transmitted only once) should be mapped preferentially to bit positions within the group having the highest reliability (i.e. lowest error probability). Transmission bits of original bits which are repeated twice (transmitted three times) should preferentially be mapped to bit positions out of a group having the lowest reliability, and transmission bits of original bits which are repeated once (i.e. transmitted twice) should be mapped to bit positions remaining vacant thereafter. If all transmission bits are mapped and all bit positions are filled, the chronological order of the mapping makes no difference as long as a monotonous relationship is maintained between number of transmission (repetition) of each bit and reliability of the bit positions to which it is assigned. For example, all bit positions may be filled starting from the least reliable ones with increasing reliability by mapping to them transmission bits starting from highest number of transmissions with decreasing number of transmission, and so on. This scheme may be analogously extended for more levels of reliability and repetition, respectively.

In the case that there are more levels of repetition than levels of reliability, the method may start with mapping the transmission bits of the unrepeated original bits to the most reliable positions and mapping the transmission bits of the original bits with most repetitions to the least reliable positions. The remaining transmission bits should be mapped in the order of decreasing number of repetitions to bit positions with ascending reliability, i.e. decreasing error probability. For example, if there are unrepeated original bits, original bits repeated once and original bits repeated twice, and the modulation scheme provides bit positions with two different levels of reliability, the transmission bits of unrepeated original bits should be mapped to the bit positions with higher reliability first. Then the transmission bits of original bits repeated twice should be mapped to bit positions with lower reliability. The transmission bits of original bits which are repeated once should then be mapped to the remaining bit positions which are still available, i.e. vacant, irrespective of their reliability. Even here alternatives in the chronological order of the mapping like described in the preceding paragraph are possible.

The rate matching rate $r_{RM}$ depends on the repetition rate and the puncturing rate employed in the rate matching block. There may be a control unit adapting those rates such that the number of transmission bits (original bit and its copy) from repeated bits exactly matches the number of low reliable bit positions defined by the selected modulation scheme. Examples:

As in FIG. 6 or FIG. 7 for 16-AM: 50% of the bit positions have low reliability. Therefore the ratio (share) of transmission bits from repeated original bits to the total number of all transmission bits should be 50%.

For 8 PSK the share of bit positions with low reliability is 33%. Therefore the ratio of transmission bits from repeated original bits to the total number of all transmission bits should be 33%.

For 64 QAM, there are three levels of reliabilities (high, medium, low). The share of positions of each reliability level is 33%. Therefore, the share of transmission bits from repeated original bits should be either 33% (mapped on positions with lowest reliability) or 66% (mapped on positions with low and medium reliability).

This control of the rate adaptation may be implemented in the AMC control unit 802, 902, 1002, 1102, 1202.

Units 801-806, 901-903, 904 *a* and *b*, 905-906, 1001-1003, 1004 *a-c*, 1005-1006, 1101-1106, 1201-1203, 1204 *a-b* and 1205-1206 are part of a transmitter for digital data communication. They may be implemented in dedicated hardware or in a digital signal processor. In this case the processor performs the method described herein by executing instructions read from a computer-readable storage medium like read-only memory, electrically erasable read-only memory or flash memory. These instructions may further be stored on other computer-readable media like magnetic disc, optical disc or magnetic tape to be downloaded into a device before it is brought to use. Also mixed hardware and software embodiments are possible.

Figure 14:
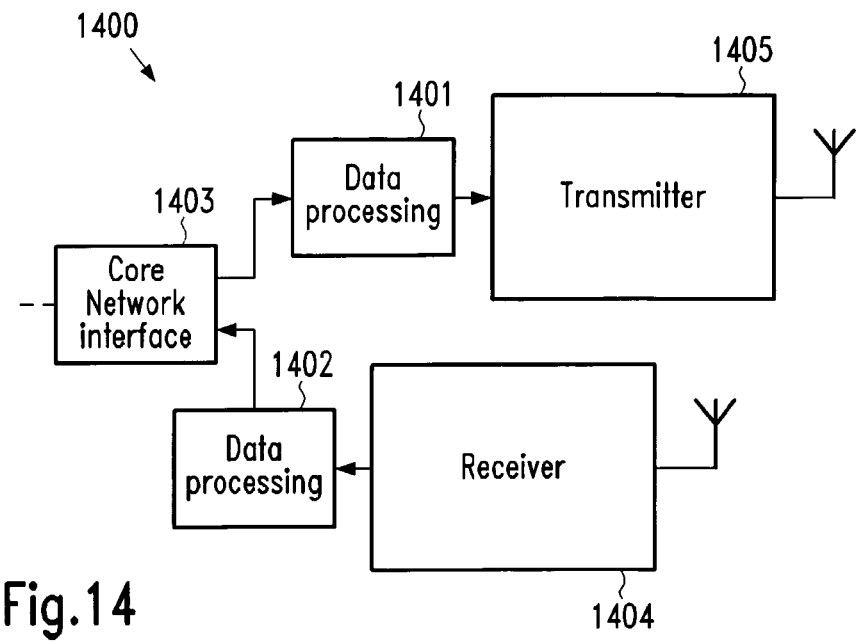
FIG. 14 illustrates an exemplary structure of a base station.

A transmitter 1405 with units described above may be part of a base station 1400 as shown in FIG. 14. Such a base station may further comprise a suitable receiver 1404, data processing units 1401 and 1402 and a core network interface 1403.

Figure 15:
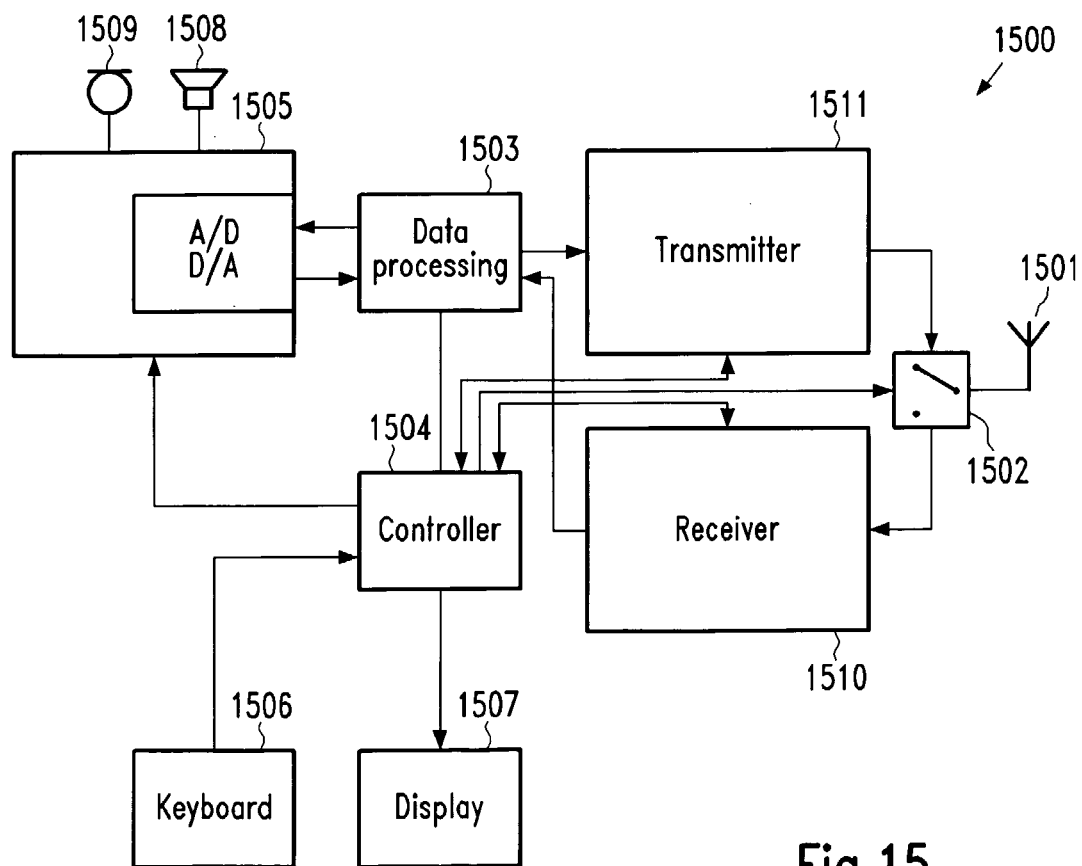
FIG. 15 illustrates an exemplary structure of a mobile station.

A counterpart to base station 1400 might be a mobile station 1500 as shown in FIG. 15. Besides transmitter 1511 and receiver 1510, a mobile station may further comprise antenna 1501, antenna switch 1502, data processing unit 1503 and controller 1504.

Mobile station 1500 might be a mobile phone or a module to be integrated into a portable computer, PDA, vehicle, vending machine or the like. A mobile phone may further comprise mixed signal unit 1505 and a user interface comprising keyboard 1506, display 1507, speaker 1508 and microphone 1509.

Figure 16:
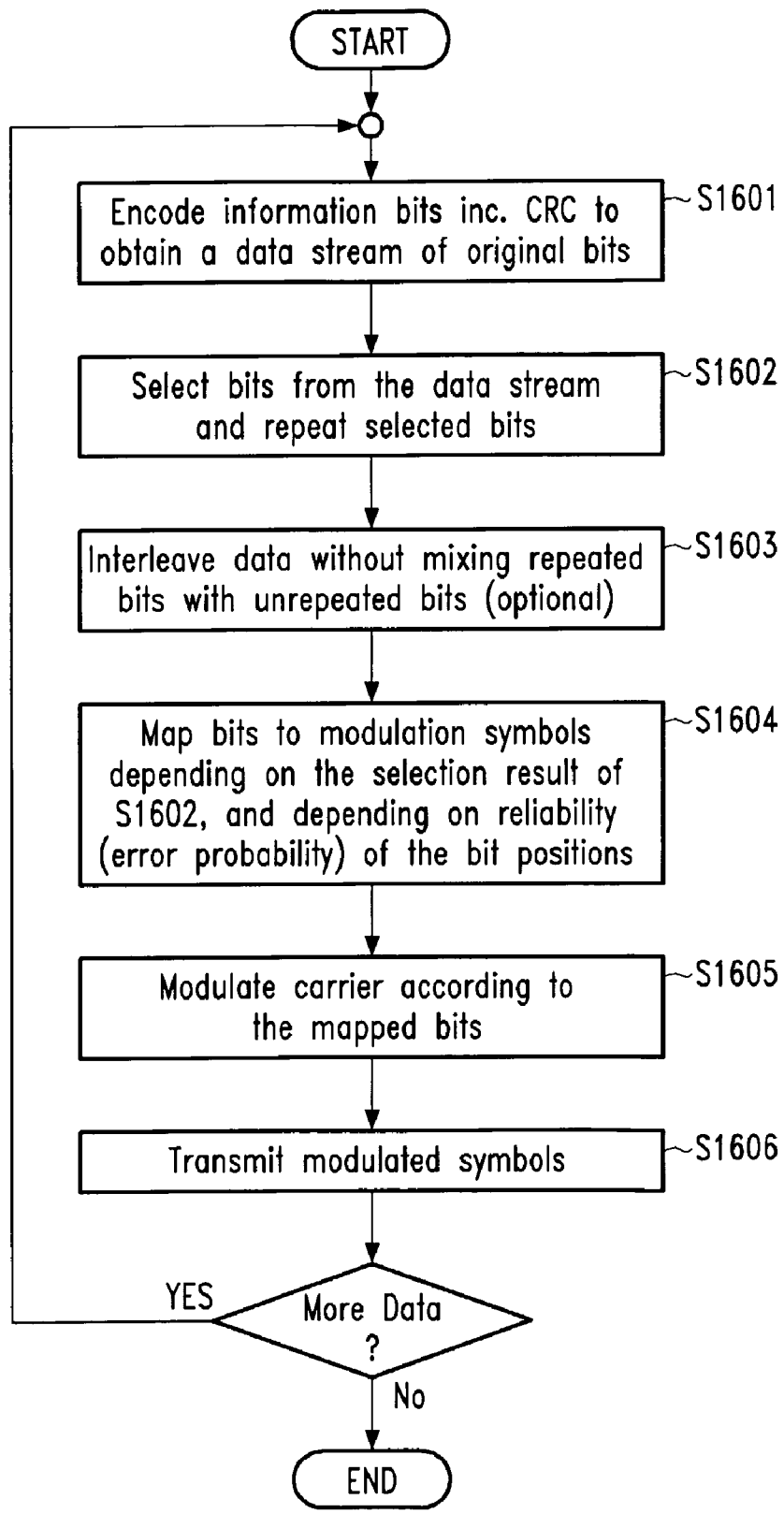
FIG. 16 illustrates the basic steps of the method described below.

FIG. 16 recapitulates the basic steps of the method described above. It is assumed that information bits incl. CRC bits are to be transmitted.

In S1601 these information bits and CRC bits are encoded in a coder which might for example be a state of the art turbo coder. The resulting data stream contains unrepeated coded bits which are called "original" bits herein. In step S1602 a part of these original bits is selected for repetition and repeated. This may be controlled to obtain a required data rate and/or a required ratio between repeated and unrepeated bits. The result of this rate matching step is a stream of transmission bits. In one alternative, the rate matching step may comprise puncturing of a selected portion of the original bits.

In an optional step S1603 the transmission bits may be interleaved to improve immunity against noise bursts. However this interleaving must maintain the division of bits into transmission bits from repeated original bits and transmission bits from unrepeated original bits, either by employing separate interleavers or by handling the bits in the shape of words in which certain positions are assigned to transmission bits of unrepeated original bits and other positions are assigned to transmission bits of repeated original bits.

In step S1604 the transmission bits are then mapped to modulation symbols. Each bit is mapped to a bit position depending on the result of the selection in step S1602, that is number of transmissions or repetition count of the respective original bit, and depending on the reliability, that is inverse error probability, of the bit position. In one alternative, the mapping is dependent on how often the original bit is transmitted, or in other words, how many transmission bits correspond to the same original bit. In this alternative, all transmission bits are divided into different categories for the mapping decision, wherein all transmission bits corresponding to an un-repeated original bit (transmitted only once) would belong to one group, each bit belonging to an original bit which is repeated once (transmitted twice) would belong to a second group, and so on. That is, the transmission bits would be assigned to the groups according to the total number of repetitions of the respective original bit. In another alternative the mapping may depend on the repetition count, that is, on how many transmission bits corresponding to the same original bit have already been transmitted. Each first transmission bit of each original bit would belong to a first group, all transmission bits being the first repetition of an original bit would belong to a second group, and so on. That is, the transmission bits would be assigned to the groups according to the number of previous transmissions of the respective original bit. The mapping of each transmission bit to a certain bit position would then in both cases be decided based on the group to which it belongs, and based on the reliability of the bit position. The advantage of such a method would be that a repetition may even be decided after the first transmission bit of the respective original bit has already been transmitted.

It should be understood that all variants described herein with respect to the first alternative described in the paragraph above, could also be applied analogously to the second alternative, while carrying out the due adaptations.

A variety of rules is applicable. For example, the mapping may be done according to a monotonous function between the number of repetitions of one original bit and the reliability of the bit position to which the corresponding transmission bits are mapped. Furthermore, bits with increasing number of transmissions may be mapped to bit positions with decreasing reliability in order to achieve a more even distribution of bit reliability after soft combining of the transmission bits belonging to one original bit.

In step S1605, a carrier is then modulated according to the mapped transmission bits, that is, a modulation state corresponding to the combination of the mapped transmission bits is generated. The generated symbol is transmitted with step S1606. Steps S1601 to S1606 may be repeated as a continuous data flow as long as data is available for transmission.

Now examples for the method described above will be given for 8-PSK, 16-QAM and 64-QAM with reference to FIGS. 5, 17 and 18.

Figure 8:
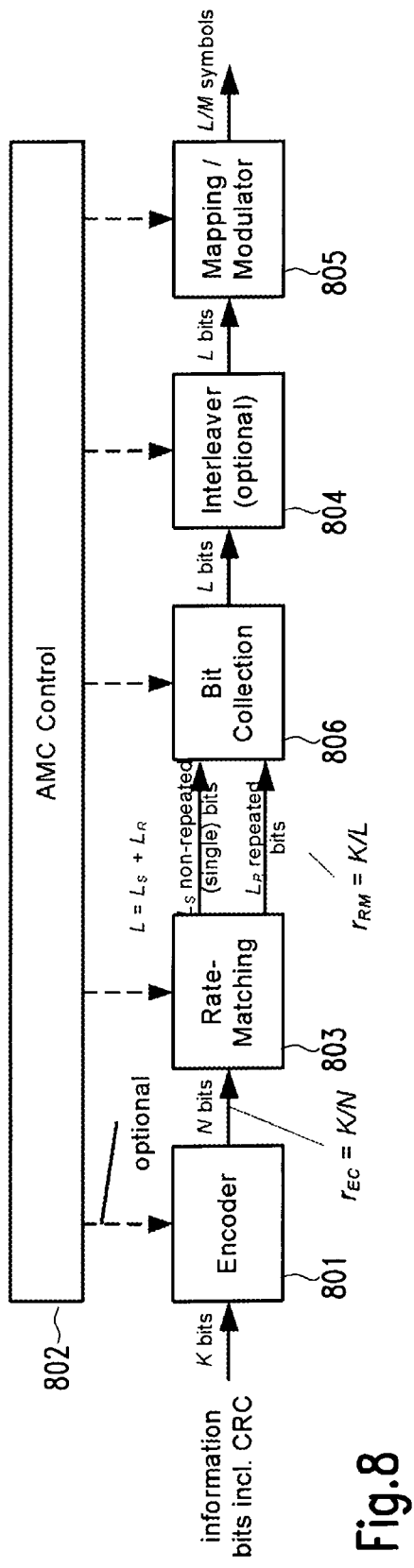
FIG. 8 illustrates a simplified physical layer transmitter chain according to a first example.

FIG. 17 shows the modulation states of an 8-PSK modulation with Gray mapping. The invention is, however, in no way limited to Gray mappings, but applicable for all mappings in which at least two different levels of reliability exist among all bit positions. Bits $b_1$ and $b_2$ each are "0" in one half plane and "1" in the other half plane. This yields a good reliability, as a high noise level would be required to turn for example a "010" state into a "000" state or a "111" state into a "011" state. Bit $b_3$, however, always toggles when a state is changed into a neighbouring state. Therefore the reliability of bit $b_3$ is lower than those of bits $b_1$ and $b_2$, which are equal. A system like in FIG. 8 is assumed where rate matching means 803 selects a fraction of the input original coded bits for repetition and repeats them. That is, a first group of transmission bits contains transmission bits of unrepeated original bits (each original bit is transmitted only once), and a second group of bits contains transmission bits of repeated original bits (each original bit is transmitted twice). If it is desired to approximate the error probability of non-repeated bits to that of repeated bits (soft combining is assumed at the receiver), mapper/modulator 805 preferentially maps repeated bits to bit position $b_3$ and non-repeated bits, which are transmitted only once, to bit positions be and $b_2$. "Preferentially" means in this context "as far as such bit positions are available". For example, if half of the original bits are selected for repetition, the second group of transmission bits will contain twice as many transmission bits as the first group. However, only ⅓ of the bit positions have low reliability. Therefore the method will preferably map the ⅓ of all bits, which is transmitted only once, to a highly reliable bit position, for example on $b_1$ (or in other cases on $b_2$ or partly on $b_1$ and partly on $b_2$). Then repeated bits will be mapped to $b_3$ having lower reliability. The remaining half of the twice transmitted bits is then mapped to $b_2$ which is still vacant, although it has higher reliability.

In one advantageous alternative, the selection of bits for repetition is controlled such that the ratio of transmission bits of both groups matches the ratio of available bit positions in both groups. In the present case each symbol transmits n=3 transmission bits, i.e. there are n=3 different bit positions available. These bit positions can be sorted in a first group of n−m=2 bit positions with high reliability (low error probability) and a second "group" of m=1 bit position with relatively low reliability (higher error probability). As each repeated original bit produces 2 transmission bits, selecting j out of k original bits for repetition yields 2·j+(k−j)=k+j transmission bits. The ratio of transmission bits requiring lower reliability to those requiring higher reliability is 2·j/(k−j). This ratio should be optimized to equal the ratio of available bit positions with low reliability to available bit positions with high reliability, which is m/(n−m). In the present example m/(n−m)=½. Therefore 2·j+(k−j) should be made to equal ½, which can be achieved by selecting every fifth original bit for repetition.

If additionally h out of k bits are punctured in the rate matching block, the number of transmission bits belonging to unrepeated original bits is k−j−h. Accordingly, in this case 2·j+(k−j−h) should be made to equal m/(n−m).

64-QAM with Gray mapping is illustrated in FIG. 18. This scheme has three levels of reliability. The group with the highest reliability comprises $i_1$ and $q_1$. $i_2$ and $q_2$ have medium reliability whereas $i_3$ and $q_3$ have lowest reliability. Now an example is assumed in which ⅔ of all original bits are repeated once and ⅓ is not repeated. Therefore ⅘ of all transmission bits will belong to original bits which are transmitted twice, and ⅕ will be transmitted only once therefore requiring higher reliability. These would be mapped first to bit positions $i_1$ and $q_1$. The bits transmitted twice would then be mapped to $i_3$ and $q_3$ first, having the lowest reliability. As more repeated bits would remain, they would also be mapped to bit positions $i_2$ and $q_2$. As the bit positions with medium and low reliability are ⅔ of all bit positions, and the repeated transmission bits are ⅘ of all transmission bits, some of them would even be mapped to bit position $i_1$ and/or $q_1$ to fill the remaining available bit positions.

The same principle applies if the number of repeated bits is smaller than the number of non-repeated bits.

Here again repeating and/or puncturing may be controlled to obtain a ratio between the groups of transmission bits of either 1:2 or 2:1, such that one of the two groups of transmission bits could be completely mapped to two groups of bit positions, and the other group of transmission bits to the third group of bit positions.

Figure 5:
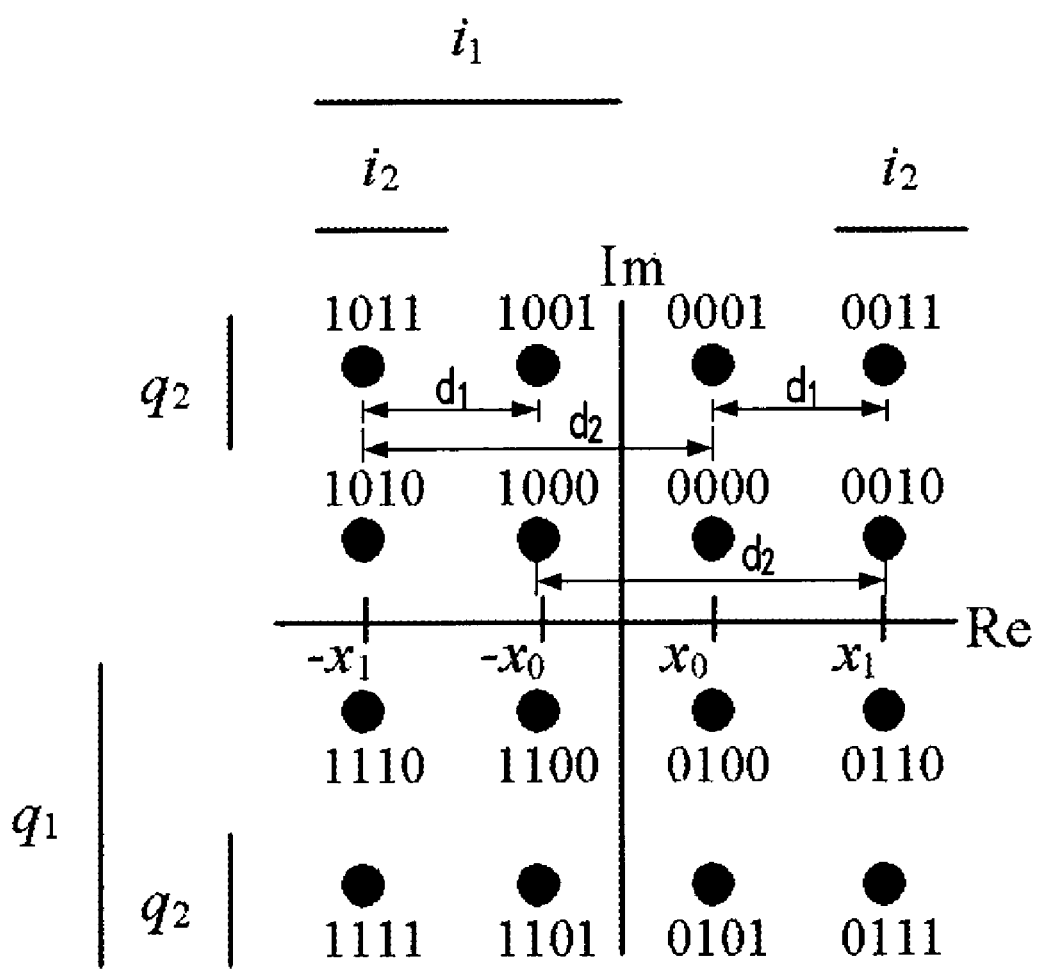
FIG. 5 illustrates a 16-QAM signal constellation with Gray mapping with $i_1$ and $q_1$ mapped on positions with high reliability and $i_2$ and $q_2$ mapped on positions with low reliability.

For the third example, return to the 16-QAM of FIG. 5. There are two groups of bit positions, $i_1$ and $q_1$ with higher reliability and $i_2$ and $q_2$ with lower reliability. Three groups of bits are assumed to exist: One first group which is not repeated (i.e. transmitted once), a second group which is repeated once (transmitted twice) and a third group which is repeated twice (transmitted three times). If ¼ of the original bits are not repeated, ½ are repeated once and ¼ are repeated twice, the ratio of transmission bits (once:twice:three times) is 1:4:3. In this example a chronological order of mapping alternative to that of the second example will be used which, however, yields the same result as the order described with the first two examples. First, all un-repeated bits are mapped to the most reliable bit positions $i_1$ and $q_1$. Then remaining $i_1$ and $q_1$ bits are filled with bits transmitted twice. As there are much more of them, they fill also all $i_2$ and $q_2$ positions and even a fraction of the $i_3$ and $q_3$ positions. The remaining $i_3$ and $q_3$ positions are then used for the bits which are transmitted three times. Provided that all bits are mapped and that all bit positions are filled, the method could even start with mapping the bits which are transmitted most often, to the least reliable bit positions and yet yield the same result. In any case, a monotonous function between the number of transmissions of each bit and the reliability (or error probability, respectively) of the bit positions to which they are assigned, is obtained.

Various embodiments as described above may provide a more evenly distributed bit reliability irrespective of the contents of the transmitted bits, thereby improving the decoding performance for commonly used coding schemes. An improved decoding performance advantageously leads to an increased net throughput of the transmission channel.

The option in which the repetition rate and puncturing rate are adapted to adjust the ratio between unrepeated and repeated bits to the ratio between available bit positions with high reliability and available bit positions with lower reliability provides further optimized bit reliability while maintaining a high data rate.

While the invention has been described with respect to the embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

The invention claimed is:

1. A method for digital data transmission using higher order modulation schemes, wherein a plurality of transmission bits is mapped to bit positions of a symbol and the transmission has different error probabilities for at least two out of said bit positions, the method comprising the steps of:
   a) selecting bits from a data stream of original bits for repetition and repeating the selected bits to obtain a stream of transmission bits;
   b) mapping the transmission bits to modulation symbols, wherein the transmission bits are mapped preferentially to bit positions selected depending on the error probabilities of the bit positions and depending on a selection result of step a), and wherein the transmission bits belonging to an original bit are mapped preferentially to bit positions selected depending on a total number of repetitions of the respective original bit; and
   c) modulating a carrier according to the mapped transmission bits.

2. The method of claim 1, wherein transmission bits with a lower number of repetitions of the respective original bit are mapped preferentially to bit positions with lower error probability having a higher reliability, and transmission bits with relatively higher number of repetitions of the respective original bit are mapped preferentially to bit positions with relatively higher error probability having a lower reliability.

3. The method of claim 1, wherein in step b) the error probability of the bit position, to which a transmission bit is mapped, as a function of the number of repetitions of the respective original bit, yields a monotonous function for all transmitted bits.

4. The method of claim 1, wherein all original bits are divided into a first group of original bits being transmitted once and a second group of original bits being transmitted twice, and all bit positions are divided into a first group of bit positions with relatively low error probability and a second group of bit positions with relatively higher error probability, and transmission bits of original bits belonging to the first group of original bits are preferentially mapped to bit positions belonging to the first group of bit positions.

5. The method of claim 4, wherein n transmission bits are mapped to one symbol, the first group of bit positions comprises n−m bit positions and the second group comprises in bit positions, and wherein the selecting in step a) is controlled to select j out of k original bits for repetition such that the ratio $2j/(k-j)$ equals in average $m/(n-m)$.

6. The method of claim 4, wherein:
   step a) further comprises selecting bits from the data stream of original bits for puncturing and puncturing the selected bits;
   j out of k original bits are selected for repetition and h out of k original bits are selected for puncturing;
   n bits are mapped to one symbol, the first group of bit positions comprises n−m bit positions and the second group comprises m bit positions; and
   step a) is controlled such that the ratio $2j/(k-j-h)$ of a number j of repeated original bits to a number $k-j-h$ of unrepeated and unpunctured original bits equals in average $m/(n-m)$.

7. The method of claim 4, wherein n transmission bits are mapped to one symbol, the first group of bit positions comprises n−m bit positions and the second group comprises in bit positions, and wherein when the ratio $2j/(k-j)$ of twice a number j of repeated original bits to a number $(k-j)$ of original bits transmitted only once is in average greater than $m/(n-m)$, an excess of transmission bits of repeated original bits is mapped to bit positions having lower error probability.

8. The method of claim 4, wherein n transmission bits are mapped to one symbol, the first group of bit positions comprises n−m bit positions and the second group comprises m bit positions, and wherein when the ratio $2j/(k-j)$ of twice a number j of repeated original bits to a number $(k-j)$ of original bits transmitted only once is in average lower than $m/(n-m)$, an excess of transmission bits of original bits transmitted only once is mapped to bit positions having higher error probability.

9. The method of claim 1 wherein:
   all bits are divided into a first group of original bits being transmitted once and a second group of original bits being transmitted twice,
   all bit positions of a symbol are divided into at least three groups of bit positions with error probabilities ascending from group to group; and
   step b) maps transmission bits of original bits belonging to the first group of original bits preferentially to positions within a first group of bit positions having the lowest error probability, and maps transmission bits of original bits belonging to the second group of original bits to bit positions remaining vacant thereafter.

10. The method of claim 1 wherein:
    all original bits are divided into three groups of original bits with number of transmissions ascending from group to group;
    all bit positions of a symbol are divided into three groups of bit positions with error probabilities ascending from group to group; and
    step b) maps transmission bits of original bits belonging to the first group of original bits preferentially to positions within a first group of bit positions having the lowest error probability, maps transmission bits of original bits belonging to the third group of original bits preferentially to positions within a third group of positions having the highest error probability, and maps remaining transmission bits to bit positions remaining vacant thereafter.

11. The method of claim 1 wherein:
    all original bits are divided into three groups of original bits with a number of transmissions ascending from group to group;
    all bit positions of a symbol can be divided into a first group having lower error probability and a second group having a higher error probability than the bit positions within the first group; and
    step b) maps transmission bits of original bits belonging to the first group of original bits preferentially to positions within the first group of hit positions, maps transmission bits of original bits belonging to the third group of original bits preferentially to bit positions of the second group of bit positions, and maps transmission bits of original bits belonging to the second group of original bits to bit positions which are remaining vacant thereafter.

12. A non-transitory computer-readable data storage medium having stored thereon instructions which, when executed in a processor of a digital data transmitter, cause the transmitter to perform the method according to claim 1.

13. A method for digital data transmission using higher order modulation schemes, wherein a plurality of transmission bits is mapped to bit positions of a symbol and the transmission has different error probabilities for at least two out of said bit positions, the method comprising the steps of:
    a) selecting bits from a data stream of original bits for repetition and repeating the selected bits to obtain a stream of transmission bits;

b) mapping the transmission bits to modulation symbols, wherein the transmission bits are mapped preferentially to bit positions selected depending on the error probabilities of the bit positions and depending on a selection result of step a), wherein a transmission bit is mapped preferentially to a bit position selected depending on a number of previous transmissions of the respective original bit; and c) modulating a carrier according to the mapped transmission bits.

14. A non-transitory computer-readable data storage medium having stored thereon instructions which, when executed in a processor of a digital data transmitter, cause the transmitter to perform the method according to claim 13.

15. A transmitter for digital data transmission using higher order modulation schemes, wherein a plurality of transmission bits is mapped to bit positions of a symbol and the transmission has different error probabilities for at least two out of said bit positions, the transmitter comprising:

a rate matching unit configured to select bits from a data stream of original bits for repetition, and to repeat the selected bits to obtain a stream of transmission bits;

a mapping unit configured to map the transmission bits to modulation symbols, wherein the transmission bits are mapped preferentially to bit positions selected depending on the error probabilities of the bit positions and depending on a selection result of said rate matching unit, and wherein said mapping unit is further configured to map the transmission bits belonging to an original bit preferentially to bit positions selected depending in addition on a number of transmissions of the respective original bit; and a modulation unit configured to modulate a carrier according to the mapped transmission bits.

16. A base station for a mobile communication system, comprising at least one transmitter according to claim 15.

17. A mobile communication system comprising:

at least one base station according to claim 16; and at least one mobile station comprising at least one transmitter for digital data transmission using higher order modulation schemes, wherein a plurality of transmission bits is mapped to bit positions of a symbol and the transmission has different error probabilities for at least two out of said bit positions, the transmitter comprising:

a rate matching unit configured to select bits from a data stream of original bits for repetition, and to repeat the selected bits to obtain a stream of transmission bits;

a mapping unit configured to map the transmission bits to modulation symbols, wherein the transmission bits are mapped preferentially to bit positions selected depending on the error probabilities of the bit positions and depending on a selection result of said rate matching unit, and wherein said mapping unit is further configured to map the transmission bits belonging to an original bit preferentially to bit positions selected depending in addition on a number of transmissions of the respective original bit; and a modulation unit configured to modulate a carrier according to the mapped transmission bits.

18. A mobile station for a mobile communication system, comprising at least one transmitter according to claim 15.

19. A transmitter for digital data transmission using higher order modulation schemes, wherein a plurality of transmission bits is mapped to bit positions of a symbol and the transmission has different error probabilities for at least two out of said bit positions, the transmitter comprising:

a rate matching unit configured to select bits from a data stream of original bits for repetition, and to repeat the selected bits to obtain a stream of transmission bits;

a mapping unit configured to map the transmission bits to modulation symbols, wherein the transmission bits are mapped preferentially to bit positions selected depending on the error probabilities of the bit positions and depending on a selection result of said rate matching unit, wherein said mapping unit is further configured to map transmission bits with a lower number of transmissions of the respective original bit preferentially to bit positions with lower error probability having a higher reliability, and to map transmission bits with a relatively higher number of transmissions of the respective original bit preferentially to bit positions with relatively higher error probability having a lower reliability; and a modulation unit configured to modulate a carrier according to the mapped transmission bits.

20. A base station for a mobile communication system, comprising at least one transmitter according to claim 19.

21. A mobile communication system comprising at least one base station according to claim 20.

22. A mobile station for a mobile communication system, comprising at least one transmitter according to claim 19.

23. A mobile communication system comprising at least one mobile station according to claim 22.

* * * * *